United States Patent [19]
Shimura et al.

[11] Patent Number: 5,644,765
[45] Date of Patent: Jul. 1, 1997

[54] IMAGE RETRIEVING METHOD AND APPARATUS THAT CALCULATES CHARACTERISTIC AMOUNTS OF DATA CORRELATED WITH AND IDENTIFYING AN IMAGE

[75] Inventors: Norio Shimura, Yokohama; Yuichi Bannai, Koganei, both of Japan

[73] Assignee: Canon Kabushiki Kaisha, Tokyo, Japan

[21] Appl. No.: 351,229

[22] Filed: Nov. 30, 1994

[30] Foreign Application Priority Data

Dec. 9, 1993 [JP] Japan ................... 5-309135

[51] Int. Cl.⁶ ........................... G06F 17/30; G06F 15/00
[52] U.S. Cl. ................... 395/615; 395/613; 395/603; 395/605; 382/162; 382/165; 382/181; 382/305
[58] Field of Search ................... 395/600, 613, 395/606, 603, 615; 364/DIG. 1; 382/162, 165, 181, 305

[56] References Cited

U.S. PATENT DOCUMENTS

| | | | |
|---|---|---|---|
| 4,823,196 | 4/1989 | Goddard | 358/310 |
| 4,931,929 | 6/1990 | Sherman | 364/401 |
| 5,010,500 | 4/1991 | Makkuni et al. | 364/521 |
| 5,019,975 | 5/1991 | Mukai | 364/413.13 |
| 5,155,774 | 10/1992 | Numagami | 382/1 |
| 5,299,116 | 3/1994 | Owens et al. | 364/403 |
| 5,321,520 | 6/1994 | Inga et al. | 358/403 |
| 5,335,084 | 8/1994 | Monemasa et al. | 358/403 |
| 5,381,158 | 1/1995 | Takahara et al. | 345/156 |
| 5,428,727 | 6/1995 | Kurosu et al. | 395/147 |
| 5,446,709 | 8/1995 | Mukai | 369/32 |
| 5,450,537 | 9/1995 | Hirai et al. | 395/149 |
| 5,509,111 | 4/1996 | Hong et al. | 395/131 |
| 5,586,197 | 12/1996 | Tsujimura et al. | 382/162 |

FOREIGN PATENT DOCUMENTS

| | | | |
|---|---|---|---|
| 0283267 | 9/1988 | European Pat. Off. | G06F 15/40 |
| 4348475 | 12/1992 | Japan | G06F 15/40 |

OTHER PUBLICATIONS

"A Similarity Retrieval Method For Image Database Using Simple Graphics", pp. 149-154, 29 Aug. 1988, T. Hamano, IEEE Workshop On Languages For Automation: Symbiotic And Intelligent Robotics.

"Querying Image Databases Using Computed Texture Features", IBM Technical Disclosure Bulletin, vol. 36, No. 6B, Jun. 1993, New York US, pp. 207-208.

*Primary Examiner*—Thomas G. Black
*Assistant Examiner*—Jean R. Homere
*Attorney, Agent, or Firm*—Fitzpatrick, Cella, Harper & Scinto

[57] ABSTRACT

An image-retrieving system for retrieving a desired image from a data base. A storage device in the data base stores a plurality of images, additional information for identifying each of the plurality of images and calculated feature data for identifying each of the images. A first input device inputs additional-information data for identifying a desired image stored in the data base. An additional-information selection device selects a first set of candidates as the desired image by comparing the input additional-information with the stored additional-information for each of the stored plurality of images. A second input device inputs an illustrative image, which is illustrative of the desired image, and a generation device generates feature data from the input illustrative image. A selection device selects as the desired image a one of the candidates whose stored feature data is most similar to the generated feature data of the input illustrative image.

12 Claims, 5 Drawing Sheets

IMAGE RETRIEVING METHOD AND APPARATUS THAT CALCULATES CHARACTERISTIC AMOUNTS OF DATA CORRELATED WITH AND IDENTIFYING AN IMAGE

BACKGROUND OF THE INVENTION

1. Field of the Invention

This invention relates to an image retrieving method and apparatus for retrieving an image from an image data base.

2. Description of the Related Art

In a conventional method of retrieving a desired image from an image data base, additional information, comprising, for example, the title and the type of image, is retrieved using keywords.

However, in retrieval using additional information, it is extremely difficult to systematically provide keywords for all of the stored images when the size of the image data base is large and the shape of each image is complicated, so that it is often impossible to retrieve a desired image by only using keywords.

SUMMARY OF THE INVENTION

The present invention has been made in consideration of the above-described problems.

It is an object of the present invention to provide an image retrieving method and apparatus which can perform very precise image retrieval to meet a user's requirements.

According to one aspect, the present invention, which achieves the above-described object, relates to an image retrieving method, comprising the steps of selecting additional information of an adapted image by comparing input additional information with stored additional information of each image stored in a data base, generating a plurality of feature data from input illustrative image data, calculating the value of the distance between each of the plurality of feature data and feature data of image data having the additional information selected in the selecting step, and selecting image data having calculated distance values in the order of smallest distance values.

According to another aspect, the present invention relates to an image retrieving apparatus, comprising additional-information selection means for selecting additional information of an adapted image by comparing input additional information with stored additional information of each image stored in a data base, generation means for generating a plurality of feature data from input illustrative image data, distance calculation means for calculating the value of a distance between each of the plurality of feature data and feature data of image data having the additional information selected by the additional-information selection means, and selection means for selecting image data having calculated distance values in the order of smallest distance values.

In the above-described configuration, the additional-information selection step selects additional information of an adapted image by comparing input additional information with stored additional information of each image stored in a data base, the generation step generates a plurality of feature data from input illustrative image data, the distance calculation step calculates the value of the distance between each of the plurality of feature data and feature data of image data having the additional information selected in the additonal-information selection step, and image data having calculated distance values are selected in the order of smallest distance values.

In the other configuration, the additional-information selection means selects additional information of an adapted image by comparing input additional information with stored additional information of each image stored in a data base, the generation means generates a plurality of feature data from input illustrative image data, the distance calculation means calculates the value of the distance between each of the plurality of feature data and feature data of image data having the additional information selected by the additional-information selection means, and image data having calculated distance values are selected in the order of smallest distance values.

The foregoing and other objects, advantages and features of the present invention will become more apparent from the following detailed description of the preferred embodiment taken in conjunction with the accompanying drawings.

DETAILED DESCRIPTION OF THE PREFERRED EMBODIMENT

Figure 1:
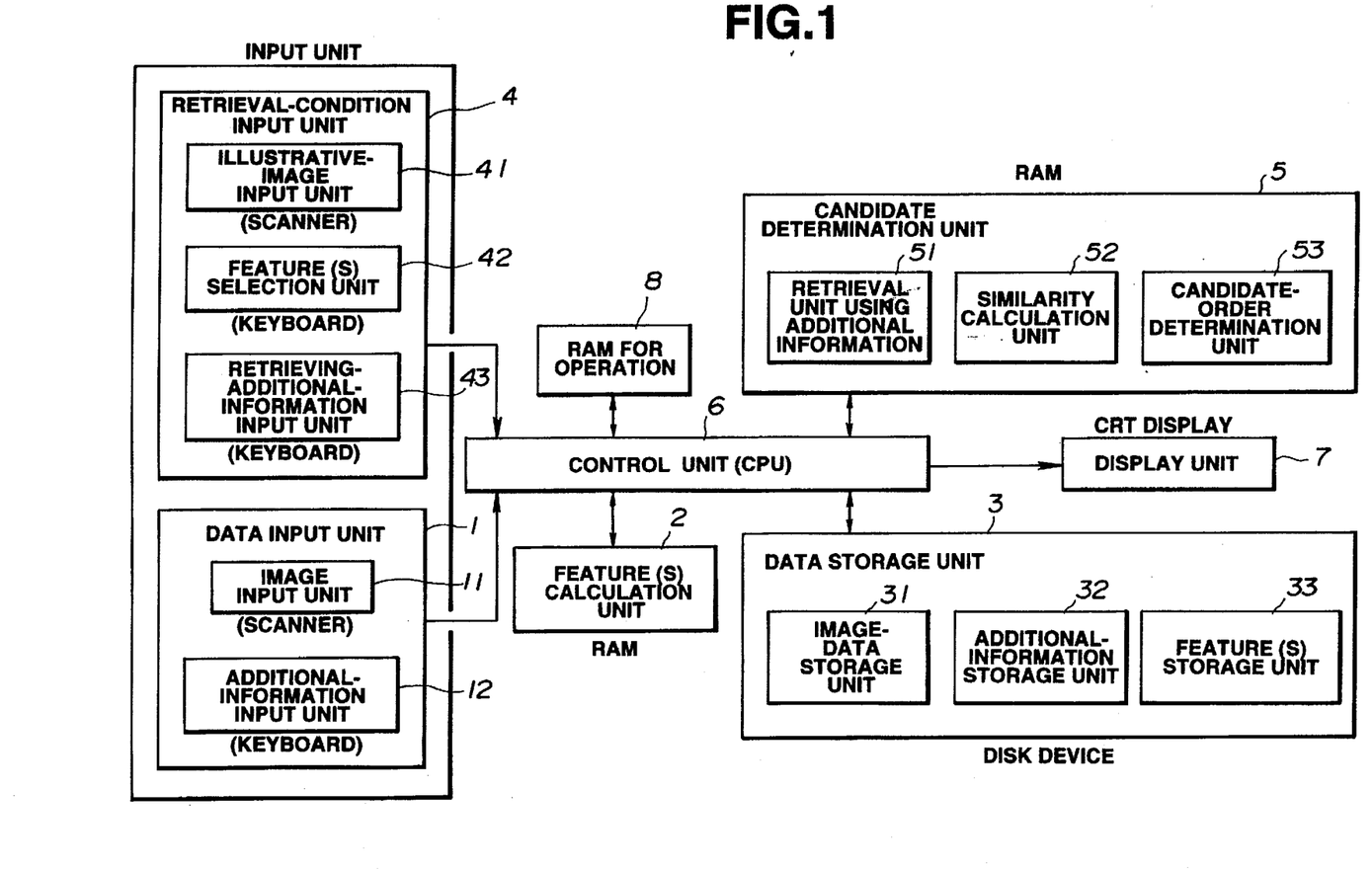
FIG. 1 is a block diagram illustrating the configuration of a retrieving apparatus according to an embodiment of the present invention.

FIG. 1 is a block diagram illustrating the configuration of an image retrieving apparatus according to an embodiment of the present invention.

In FIG. 1, a data input unit 1 comprises, for example, a scanner or the like for inputting data to be stored in a data base. A feature calculation unit 2 comprises, for example, a RAM (Random Access Memory), which stores, for example, a software program for extracting various kinds of characteristic-amounts for an input image. A control unit 6 extracts various kinds of features for an input image by reading and executing the software program.

A data storage unit 3 comprises, for example, a hard disk, which stores input data. A retrieval-condition input unit 4 comprises, for example, a keyboard, a mouse or the like for inputting retrieval conditions for retrieving desired data. A candidate determination unit 5 comprises a RAM, which stores a software program for selecting candidate images from images stored in the data storage unit 3 based on the retrieval conditions input from the retrieval-condition input unit 4. A display unit 7 comprises, for example, a CRT display for displaying image data, an input command, processed data and the like. The control unit 6 comprises a central processing unit for controlling the entirety of the above-described blocks, and realizes the functions of the respective blocks by reading and executing the software program.

The function of each of the above-described blocks will now be described in detail.

The data input unit 1 includes an image input unit 11, such as a scanner or the like, for inputting image data, and an additional-information input unit 12 for inputting information relating to an image, such as the name of the image, the date, and other necessary information.

The data storage unit 3 includes an image-data storage unit 31 for storing image data input through the data input unit 1, an additional-information storage unit 32 for storing additional information of image data stored in the image-data storage unit 31 so as to correspond to the image data, and a feature storage unit 33 for storing a feature calculated by the feature calculation unit 2 so as to correspond to each image data.

Image data is retrieved by the above-described configuration.

The candidate determination unit 5 stores the software program, and includes a retrieval unit 51 using additional information, a similarity calculation unit 52 for calculating similarity using features, and a candidate-order determination unit 53 for sorting feature data of a plurality of candidates in the order of higher similarity.

Figure 3:
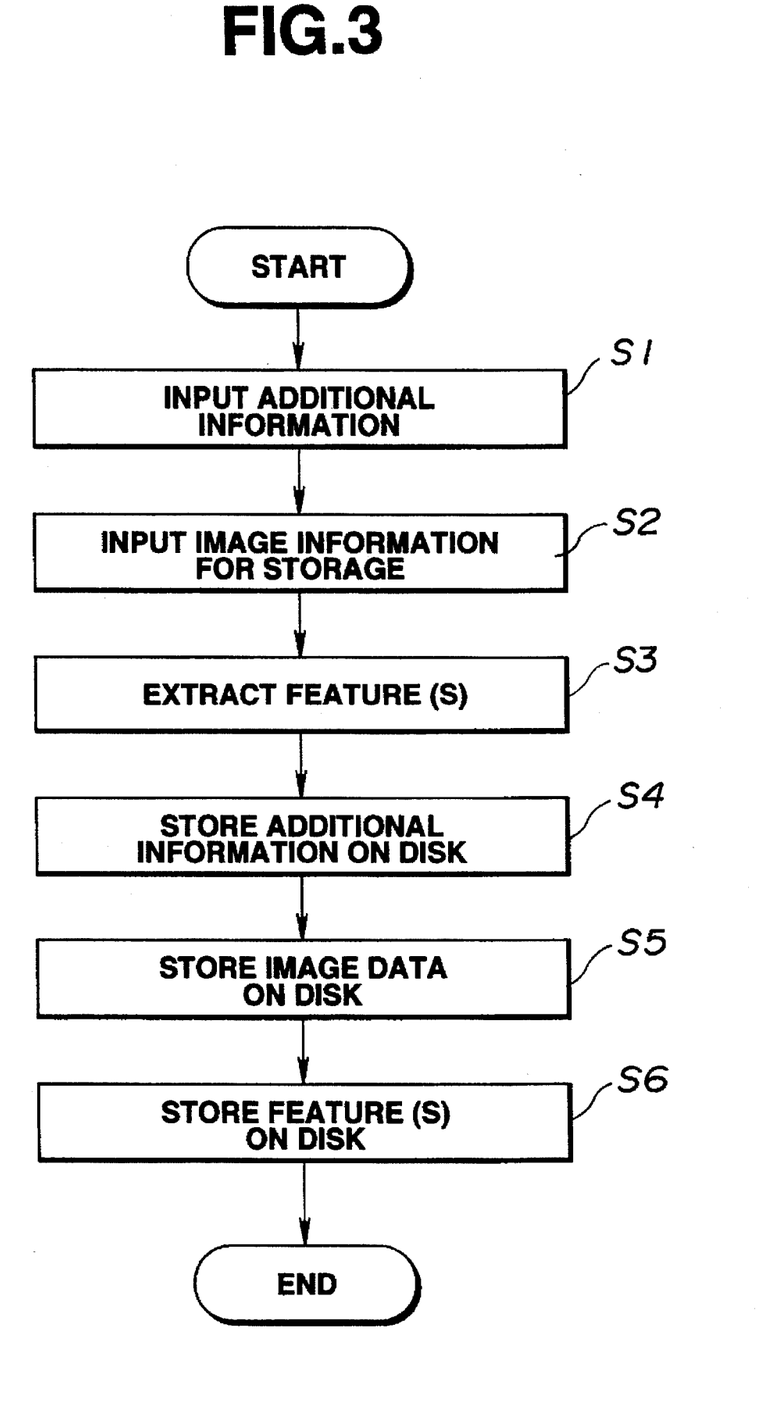
FIG. 3 is a flowchart illustrating retrieval processing using additional information.

FIG. 3 is a flowchart illustrating procedures for forming a data base, i.e., processing procedures from inputting of a group of image data to be retrieved until storing of the input data in the data storage unit 3. A description will now be provided for each of the steps.

In step S1, additional information relating to an image to be input, comprising the name of the image, the date, and other necessary information, is input through the additional-information input unit 12.

In step S2, image data corresponding to the additional information input in step S1 is input through the image input unit 11, comprising the scanner.

In step S3, the feature calculation unit 2 extracts a plurality of features indicating characteristics of the corresponding image from the image data input in step S2.

The feature may comprise the number of black pixels in each of a plurality of blocks obtained by dividing an image region, the number of black pixels on each line, the number of black/white reversal portions on each line, or a combination of at least one of the above-described numbers.

In step S4, the additional information input in step S1 is stored in the additional-information storage unit 32. The additional information further comprises positional information relating to a position where the image data is to be stored in step S5, and positional information relating to a position where the extracted features are to be stored in step S6.

In step S5, the input image data is stored in the image data storage unit 31 of the data storage unit 3.

In step S6, the extracted features are stored in the feature storage unit 33.

The data relating to the input image data can be easily stored so as to correlate with each other, for example, by using a data base management system comprising a correlated data base or the like.

Figure 4:
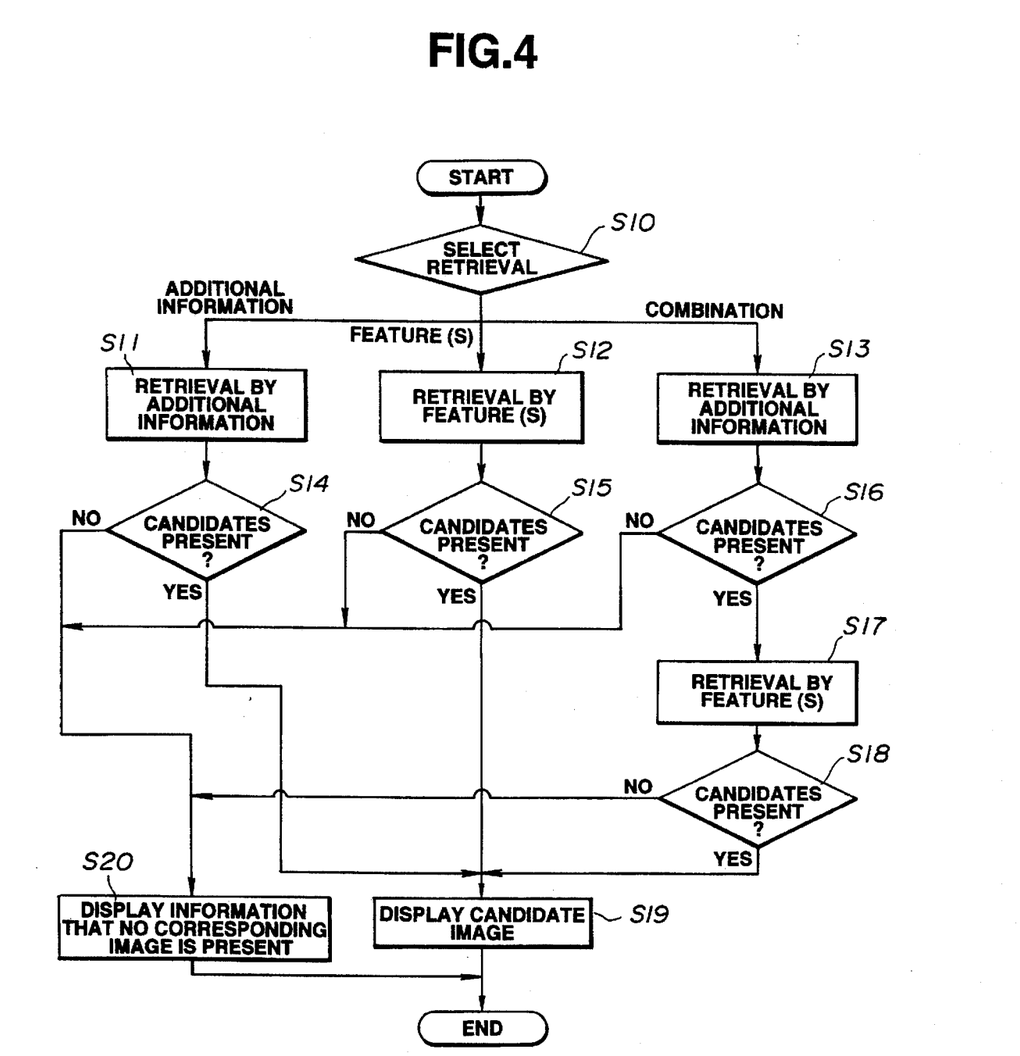
FIG. 4 is a diagram illustrating retrieval processing of the present embodiment.

Next, a description will be provided for a method of inputting retrieval conditions and retrieving necessary image data from a group of stored image data, with reference to the flowchart shown in FIG. 4.

Three methods of retrieving a desired image are described below. In a first method, a desired image is retrieved by additional information in a series of steps starting from step S11.

In a second method, a similar image is obtained from an illustrative image in a series of steps starting from step S12.

In a third method, the first and second methods are combined.

First, the first method will be described.

In the first retrieval method using additional information, previously known additional information relating to a desired image, comprising the name of the image, whether the image comprises a color image or a monochromatic image, the date of registration of the image, the type of image, or the like, is input through a retrieving-additional-information input unit 43, and adapted additional information is retrieved from additional information stored in the additional-information storage unit 32. The retrieval by additional information can easily be executed using a correlated-data-base operation language such as SQL or the like.

Next, the second method will be described.

In the second retrieval method using illustrative images, the user inputs a plurality of illustrative images, which are illustrative of the desired image, through an illustrative-image input unit 41, and an image which resembles one of the illustrative images is retrieved.

Image data stored in the data base may be used as the illustrative images. In this case, since the selected illustrative image completely coincides with one of the stored image data, the coincident image data is selected as a first candidate. Thereafter, remaining image data is sequentially selected as candidates starting from a second candidate in the order of similarity.

Figure 2:
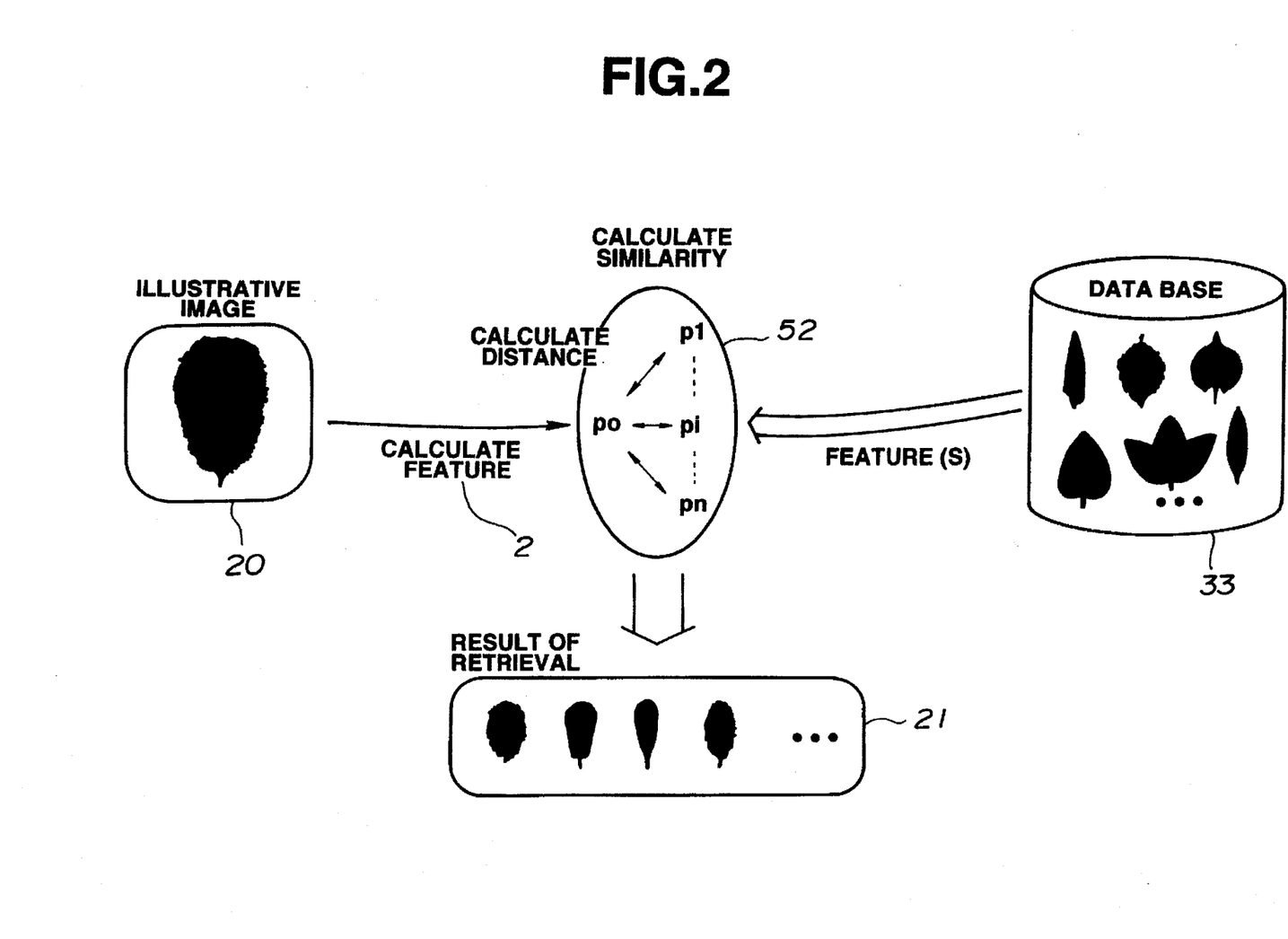
FIG. 2 is a diagram illustrating the concept of retrieval using an illustrative image.
Figure 5:
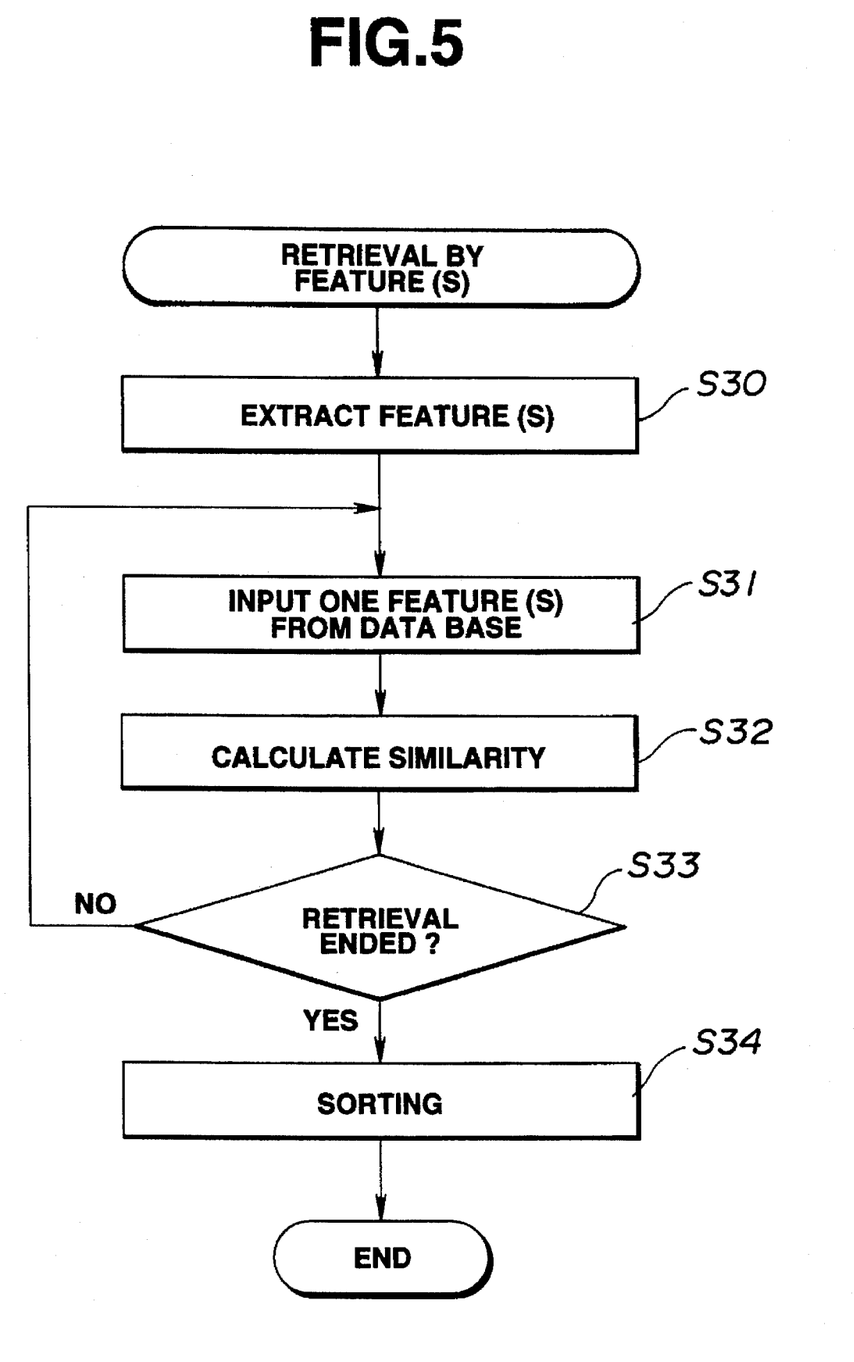
FIG. 5 is a flowchart illustrating retrieval processing using characteristic-amounts.

FIG. 2 is a schematic diagram illustrating the method of retrieving image data from a data base using an illustrative image. FIG. 5 is a flowchart illustrating the processing procesures of the method.

First, in step S30, a plurality of features are calculated by the feature calculation unit 2 using an illustrative image 20 input through the illustrative-image input unit 41. For example, a feature calculation by calculation unit 2 of the illustrative image 20 shown in FIG. 2 is performed, whereby a feature p0 is obtained.

In step S31, one feature is read from the disk of the feature storage unit 33 of the data base into a RAM 8 for operation. For example, in FIG. 2, a feature p1 is read from the feature storage unit 33 of the data base. Although in the case of FIG. 2, only one feature is read at one time, a plurality of features may, of course, be read if the capacity of the RAM 8 for operation is large.

In step S32, the distance between each of the features of the data base stored in the RAM 8 for operation and the feature of the illustrative image is calculated (see FIG. 2). Image data which has the smallest distance value is determined to be most similar to the illustrative image. This processing is performed by the similarity calculation unit 52.

In step S33, it is determined if all features stored in the data base have been read and retrieved. If the result of the determination is negative, the process returns to step S31 in order to repeat the calculation of the distance for the next data to be retrieved. If the result of the determination is affirmative, the process proceeds to step S34.

In step S34, features of the data base having distance values smaller than a predetermined threshold are sorted in the order of smallest distance values. A result of retrieval 21 shown in FIG. 2 illustrates an example of such processing. This processing is performed by the candidate-order determination unit 53.

A description has been provided of the retrieval method by features using a single illustrative image. When using at least two illustrative images, the above-described distance is calculated for each of the illustrative images, the average of obtained distance values is made a final distance value, sorting is performed based on the average, and the order of candidates is determined. Various other methods for obtaining the final order of candidates can be considered. In one method, the user assigns a weighted value for the distance value for each illustrative image, and the final distance value is calculated using assigned values. In another method, the order of candidates is determined for each illustrative image, and the final order of candidates is obtained from the relationship among the orders of candidates for respective illustrative images, for example, from the sum of the orders of the same candidate. By using a plurality of illustrative images in the above-described manner, it is possible to increase the amount of information used for retrieval, and to perform image retrieval which is most suitable for the user's requirements.

The selection of the feature to be used can be assigned by an input operation by the user through a keyboard or the like. When the feature to be used is not assigned, the calculation of the distance is performed using a predetermined feature.

In the present embodiment, similarity between images is obtained by calculating the distance between the features of the respective images.

Next, a description will be provided of the entire retrieval processing of the present embodiment with reference to the flowchart shown in FIG. 4.

In step S10, one of the following three methods is selected through the keyboard, serving as the retrieval-condition input unit 4.

1. Image retrieval is performed using additional information as a retrieval key.
2. Image retrieval is performed using features as a retrieval key.
3. Image retrieval is performed using both additional information and features as a retrieval key.

In step S11 and steps which follow step S11, image retrieval processing is performed using additional information as a retrieval key.

First, in step S11, matching processing between additional information input through the retrieving-additional-information input unit 43 and additional information stored in the additional-information storage unit 32 of the data base are used in order to retrieve an image having adapted additional information.

In step S14, it is determined if an image having adapted additional information is present.

If the result of the determination is negative, the process proceeds to step S20. If the result of the determination is affirmative, the image is determined to be a candidate image, and the process proceeds to step S19.

In step S12 and steps which follow step S12, image retrieval processing is performed using features as a retrieval key.

First, in step S12, the processing conforming to the flow of image retrieval by features, which has already been described with reference to FIG. 5, is performed. Candidate images are sorted in the order of higher similarity in terms of features.

In step S15, it is determined if the similarity of an image is greater than a predetermined threshold.

If the result of the determination is negative, the process proceeds to step S20. If the result of the determination is affirmative, the image is determined to be a candidate image, and the process proceeds to step S19.

In step S13 and steps which follow step S13, image retrieval processing is performed using both additional information and features as a retrieval key.

First, in step S13, retrieval by additional information, which has already been described in step S11, is performed.

In step S16, it is determined if adapted additional information is present.

In step S17, only images retrieved by using additional information as a key are retrieved by the features of respective images. This processing is equivalent to the processing described with reference to FIG. 5, and images retrieved by features are sorted in the order of higher similarity.

In step S18, it is determined if the similarity of a retrieved image is greater than a predetermined threshold.

If the result of the determination is negative, the process proceeds to step S20. If the result of the determination is affirmative, the image is detemined to be a candidate image, and the process proceeds to step S19.

In step S19, retrieved candidate images are displayed on the picture surface of the display unit 7, and the process is terminated.

In step S20, information indicating the absence of candidate images is displayed on the display unit 7.

By performing retrieval by combining illustrative images and additional information in the above-described manner, previously known additional information can be added to similarity retrieval by illustrative images, so that it is possible to perform retrieval which is most suited to the user's requirements.

In another method of performing similarity retrieval using a plurality of illustrative images, similarity retrieval can be performed by individually assigning a feature used for calculating similarity for each illustrative image by the feature selection unit 42. For example, similarity retrieval is performed by calculating similarity using features a and b for an illustrative image X, and using features c, d and e for an illustrative image Y.

According to this method, since important features of each illustrative image can be individually assigned, accuracy in entire retrieval can be further improved.

The present invention may be applied to a system which comprises a plurality of apparatuses, or to an apparatus which comprises a single unit. The present invention may, of course, be applied when the object of the invention is achieved by supplying a system or an apparatus with a program.

As described above, the following effects are obtained according to the above-described embodiment. That is, in an operation of retrieving a desired image from an image data base, by retrieving similar images from a plurality of illustrative images and additional information, accuracy in retrieval is improved, and efficient similarity retrieval can be realized. Additional information alone, features alone, or a combination of additional information and features can be selected as a retrieval key, so that flexible image retrieval which is most suitable to the user's requirements can be performed.

The individual components shown in outline or designated by blocks in the drawings are all well known in the image retrieving method and apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image retrieval method, comprising the steps of:

storing in a data base a plurality of images, additional-information for identifying each of the plurality of images and calculated characteristic-amounts of data correlated with, and identifying each of the images;

inputting additional-information data and illustrative image data for identifying a desired image stored in said data base;

selecting additional information of an image by comparing the input additional information with the additional information of each image stored in the data base;

generating a plurality of characteristic-amounts of data from, and correlated with the input illustrative image data;

calculating the difference between each of the generated plurality of characteristic-amounts of data and characteristic-amounts of data of image data having the additional information selected in the selecting step; and selecting image data having a calculated difference in the order of smallest difference as the desired image.

2. A method according to claim 1, further comprising the steps of:

selecting image data having a difference smaller than a predetermined value;

sorting the image data selected in the selecting step in the order of smallest difference; and displaying the sorted image data.

3. An image retrieving apparatus for retrieving a desired image from a data base, comprising:

a storage means in said data base for storing a plurality of images, additional-information for identifying each of the plurality of images and calculated characteristic-amounts of data correlated with, and identifying each of the images;

a first input means for inputting additional-information data for identifying a desired image stored in said data base;

a second input means for inputting an illustrative image of the desired image;

additional-information selection means for selecting additional information of an image by comparing the input additional information with additional information of each image stored in the data base;

generation means for generating a plurality of characteristic-amounts of data from, and correlated with the input illustrative image data;

difference calculation means for calculating the difference between each of the generated plurality of characteristic-amounts of data and characteristic-amounts of data of image data having the additional information selected by said additional-information selection means; and selection means for selecting image data having a calculated difference in the order of smallest difference as the desired image.

4. An apparatus according to claim 3, further comprising:

image-data selection means for selecting image data having a difference smaller than a predetermined value;

means for sorting the image data selected by said image-data selection means in the order of smallest difference; and display means for displaying the sorted image data.

5. An image-retrieving system for retrieving a desired image from a data base, comprising:

a storage means in said data base for storing a plurality of images, additional-information for identifying each of the plurality of images and calculated characteristic-amounts of data correlated with, and identifying each of the images;

a first input means for inputting additional-information data for identifying a desired image stored in said data base;

additional-information selection means for selecting a set of candidates as the desired image by comparing the input additional-information with the stored additional-information for each of the stored plurality of images;

a second input means for inputting an illustrative image of the desired image;

generation means for generating characteristic-amounts of data from, and correlated with the input illustrative image;

similarity calculation means for calculating the similarity between the stored characteristic-amounts of data of each of the set of candidates and the generated characteristic-amounts of data of the input illustrative image; and selection means for selecting as the desired image a one of the candidates whose stored characteristic-amounts of data is most similar to the generated characteristic-amounts of data of the input illustrative image.

6. The image retrieving system of claim 5, wherein said similarity calculation means calculates similarity based on the difference between the stored characteristic-amounts of data of each of the set of candidates and the generated characteristic-amounts of data of the illustrative image.

7. The image retrieving system of claim 5, wherein said selection means selects the desired image based on the smallest difference between the stored characteristic-amounts of data of each of the set of candidates and the generated characteristic-amounts of data of the illustrative image.

8. The image retrieving system of claim 7, wherein said selection means includes:

means for sorting the candidates based in the order of smallest difference between the stored characteristic-amounts of data of each of the set of candidates and the generated characteristic-amounts of data of the illustrative image; and display means for displaying the sorted candidates so as user may select one of the candidates as the desired image.

9. An image-retrieving method for retrieving a desired image from a data base, comprising the steps of:

storing a plurality of images, additional-information for identifying each of the plurality of images and calculated characteristic-amounts of data for identifying each of the images;

inputting additional-information data correlated with, and identifying a desired image stored in said data base;

selecting a set of candidates as the desired image by comparing the input additional-information with the stored additional-information for each of the stored plurality of images;

inputting an illustrative image of the desired image;

generating characteristic-amounts of data from, and correlated with the input illustrative image;

calculating the similarity between the stored characteristic-amounts of data of each of the set of candidates and the generated characteristic-amounts of data of the input illustrative image; and selecting as the desired image a one of the candidates whose stored characteristic-amounts of data is most similar to the generated characteristic-amounts of data of the input illustrative image.

10. The image retrieving method of claim 9, wherein calculating the similarity is based on the difference between the stored characteristic-amounts of data of each of the set of candidates and the generated characteristic-amounts of data of the illustrative image.

11. The image retrieving method of claim 10, wherein selecting the desired image is based on the smallest difference between the stored characteristic-amounts of data of each of the set of candidates and the generated characteristic-amounts of data of the illustrative image.

12. The image retrieving method of claim 11, wherein the step of selecting the desired image includes the steps of:

sorting the candidates based in the order of smallest difference between the stored characteristic-amounts of data of the set of candidates and the generated characteristic-amounts of data of the illustrative image; and displaying the sorted candidates so a user may select one of the candidates as the desired image.

* * * * *

UNITED STATES PATENT AND TRADEMARK OFFICE
CERTIFICATE OF CORRECTION

PATENT NO. : 5,644,765

DATED : July 1, 1997

INVENTORS : NORIO SHIMURA ET AL.

It is certified that error appears in the above-identified patent and that said Letters Patent is hereby corrected as shown below:

ON THE TITLE PAGE

"CHARACTERISTIC AMOUNTS" should read --CHARACTERISTIC-AMOUNTS--.

[56] References Cited    FOREIGN PATENT DOCUMENTS

"4348475" should read --4-348475--.

COLUMN 1

Line 3, "CHARACTERISTIC AMOUNTS" should read -- CHARACTERISTIC-AMOUNTS--.

COLUMN 4

Line 29, "procesures" should read --procedures--.

COLUMN 6

Line 14, "detemined" should read --determined--.

UNITED STATES PATENT AND TRADEMARK OFFICE
CERTIFICATE OF CORRECTION

PATENT NO. : 5,644,765

DATED : July 1, 1997

INVENTORS : NORIO SHIMURA ET AL.

It is certified that error appears in the above-identified patent and that said Letters Patent is hereby corrected as shown below:

COLUMN 8 line 52, "as" should read --a--.

Signed and Sealed this

Seventeenth Day of March, 1998

Attest:

BRUCE LEHMAN

Attesting Officer

Commissioner of Patents and Trademarks